US012790859B2

(12) United States Patent
Patel et al.

(10) Patent No.: US 12,790,859 B2
(45) **Date of Patent: *Nov. 10, 2026**

(54) DOOR ASSEMBLY FOR MOTOR VEHICLE

(71) Applicant: Ford Global Technologies, LLC, Dearborn, MI (US)

(72) Inventors: Rajesh K. Patel, Farmington, MI (US); Constantin Manolescu, Rochester Hills, MI (US); Floyd Anthony Harter, Saint Clair, MI (US); Laeth Zahed, Dearborn, MI (US); Tony Nguyen, Troy, MI (US); Sara James, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/019,606

(22) Filed: Jan. 14, 2025

(65) Prior Publication Data

US 2025/0154802 A1 May 15, 2025

Related U.S. Application Data

(63) Continuation of application No. 18/073,817, filed on Dec. 2, 2022, now Pat. No. 12,428,882.

(51) Int. Cl.
*E05B 85/10* (2014.01)
*B60J 5/04* (2006.01)
(Continued)

(52) U.S. Cl.
CPC ............. *E05B 81/76* (2013.01); *B60J 5/0468* (2013.01); *B60Q 1/323* (2013.01); *B60R 25/20* (2013.01);
(Continued)

(58) Field of Classification Search
CPC ..... B60J 5/046; B60J 5/047; B60J 5/04; B60J 5/0468; E05B 85/10; E05B 85/00;
(Continued)

(56) References Cited

U.S. PATENT DOCUMENTS 7,375,299 B1 5/2008 Pudney
9,016,910 B2 4/2015 Bingle
(Continued)

FOREIGN PATENT DOCUMENTS

JP 6078647 B2 2/2017

OTHER PUBLICATIONS

Lincoln. (Sep. 10, 2019). What is Lincoln® Light Touch Handle Electronic Door System? | how-to | Lincoln. YouTube. Retrieved Dec. 2, 2022, from https://www.youtube.com/watch?v=0PrBDVfUzPk.

Amazon.com: Maiker Button Release RGB led door handles kit, bluetooth . . . (n.d.). Retrieved Dec. 2, 2022, from https://www.amazon.com/Bluetooth-Compatible-Strobing-Function-2007-2018/dp/B09GVNDDGZ.

*Primary Examiner* — Muhammad Ijaz
*Assistant Examiner* — Susan M. Heschel
(74) *Attorney, Agent, or Firm* — Vichit Chea; Carlson, Gaskey & Olds, P.C.

(57) ABSTRACT

In some aspects, the techniques described herein relate to a door assembly for a motor vehicle, including: a door mounted relative to an opening in a body of the motor vehicle such that the door is moveable between a fully closed position and a fully open position; and a fixed door handle projecting outward from an exterior surface of the door, and wherein the fixed door handle includes a switch assembly configured to generate an electric signal when pressed.

14 Claims, 8 Drawing Sheets

(51) Int. Cl.
*B60Q 1/32* (2006.01)
*B60R 25/20* (2013.01)
*E05B 81/76* (2014.01)
*E05F 15/00* (2015.01)

(52) U.S. Cl.
CPC .............. *E05B 85/10* (2013.01); *E05F 15/00* (2013.01); *E05Y 2400/45* (2013.01); *E05Y 2400/854* (2013.01); *E05Y 2400/86* (2013.01); *E05Y 2900/531* (2013.01)

(58) Field of Classification Search
CPC ......... E05B 81/76; E05F 15/611; E05F 15/00; B60R 16/005; B60R 25/20; B60Q 1/323
See application file for complete search history.

(56) References Cited

U.S. PATENT DOCUMENTS

| | | | | |
|---|---|---|---|---|
| 9,156,335 | B1 * | 10/2015 | Harter | E05B 85/10 |
| 9,441,403 | B2 | 9/2016 | Kraus et al. | |
| 11,396,764 | B2 | 7/2022 | Blount et al. | |
| 11,554,646 | B2 * | 1/2023 | Walawender | E05B 85/12 |
| 11,619,079 | B2 * | 4/2023 | Linden | E05B 81/77<br>292/336.3 |
| 2017/0260778 | A1 * | 9/2017 | Witte | G07C 9/00174 |
| 2020/0011096 | A1 * | 1/2020 | Leonardi | E05B 81/78 |
| 2020/0362602 | A1 | 11/2020 | Sobecki et al. | |
| 2022/0213722 | A1 * | 7/2022 | Linden | E05B 85/10 |
| 2024/0200370 | A1 | 6/2024 | Frattini et al. | |

* cited by examiner

DOOR ASSEMBLY FOR MOTOR VEHICLE

CROSS-REFERENCE TO RELATED APPLICATIONS

This application is a continuation of U.S. patent application Ser. No. 18/073,817, which was filed on Dec. 2, 2022 and is incorporated herein by reference in its entirety.

TECHNICAL FIELD

This disclosure relates to a door assembly for a motor vehicle.

BACKGROUND

Motor vehicles are known to include doors, which are mounted to a body of the motor vehicle and are moveable between closed and open positions to selectively cover and uncover openings in the body of the motor vehicle. Moving a door to an open position permits users to enter or exit the vehicle and/or permits users to insert items into, or retrieve items from, the vehicle. Vehicle doors can be opened manually or may be capable of partially or fully opening automatically using powered systems.

SUMMARY

In some aspects, the techniques described herein relate to a door assembly for a motor vehicle, including: a door mounted relative to an opening in a body of the motor vehicle such that the door is moveable between a fully closed position and a fully open position; and a fixed door handle projecting outward from an exterior surface of the door, and wherein the fixed door handle includes a switch assembly configured to generate an electric signal when pressed.

In some aspects, the techniques described herein relate to a door assembly, wherein: the door includes trim, and the fixed door handle projects outward from the trim.

In some aspects, the techniques described herein relate to a door assembly, wherein the trim is a belt molding.

In some aspects, the techniques described herein relate to a door assembly, wherein: the fixed door handle includes a base section and a top section, and the base section is integrally formed with the trim.

In some aspects, the techniques described herein relate to a door assembly, wherein: the base section includes a top, bottom, leading edge, trailing edge, and lateral edge, the leading edge of the base section projects laterally outward from a remainder of the trim and is tapered moving in a forward direction, and the top of the base section includes a recess configured to receive the top section.

In some aspects, the techniques described herein relate to a door assembly, wherein: the bottom of the base section is vertically aligned with or vertically above a bottom of the remainder of the trim, and the top of the base section is vertically aligned with or vertically below a top of the remainder of the trim.

In some aspects, the techniques described herein relate to a door assembly, wherein: the top section includes a leading edge, a trailing edge, a top, an inner surface facing the door, and an outer surface facing away from the door.

In some aspects, the techniques described herein relate to a door assembly, wherein the leading edge of the top section is tapered in a forward direction.

In some aspects, the techniques described herein relate to a door assembly, wherein the inner surface of the top section includes the switch assembly.

In some aspects, the techniques described herein relate to a door assembly a, wherein the switch assembly includes a pad and a plurality of switches configured to generate the electric signal.

In some aspects, the techniques described herein relate to a door assembly, wherein the outer surface of the top section includes a light.

In some aspects, the techniques described herein relate to a door assembly, wherein the light is configured to illuminate in a custom sequence selected by a user.

In some aspects, the techniques described herein relate to a door assembly, wherein the top section includes a mount assembly configured to interface with a panel of the door when the top section is received in the recess of the base section.

In some aspects, the techniques described herein relate to a door assembly, wherein the door is free of pivotable exterior door handles.

In some aspects, the techniques described herein relate to a door assembly, further including a latch assembly configured to selectively lock and unlock the door, wherein the latch assembly is configured to unlock the door in response to the electric signal.

In some aspects, the techniques described herein relate to a door assembly, further including a door presenter assembly configured to move the door from the fully closed position to a partially open in response to the electric signal.

In some aspects, the techniques described herein relate to a door assembly, wherein, in response to the signal from the switch assembly, the door is configured to both unlock and move to a partially open position.

In some aspects, the techniques described herein relate to a method, including: activating one or both of a door presenter assembly and a latch assembly of a door in response to a signal generated by a switch assembly, wherein a fixed door handle projecting outward from an exterior surface of the door includes the switch assembly.

In some aspects, the techniques described herein relate to a method, further including, after the activating step, manually moving the door to a fully open position using the fixed door handle by pulling on the fixed door handle and by applying a force in a same location as in the activating step.

In some aspects, the techniques described herein relate to a method, further including illuminating a light, wherein an outer surface of the fixed door handle includes the light.

BRIEF DESCRIPTION OF THE DRAWINGS

FIG. 4 is a view of an opposite side of the fixed door handle relative to the view shown in FIG. 3.

DETAILED DESCRIPTION

This disclosure relates to a door assembly for a motor vehicle. This disclosure provides a number of benefits which will be appreciated from the following description. Among them, this disclosure permits a user to both (i) unlock and/or present a door, and (ii) to open the door using a single, intuitive movement. Specifically, a user can unlock and/or present the door by applying a force to a switch assembly of a fixed door handle and the user can continue to apply a force to the same location on the fixed door handle, without needing to move or reposition their hand, to move the door to an open position. Further, the disclosed door assembly includes a fixed door handle that achieves a desirable aesthetic, is aerodynamic, and facilitates water management.

Figure 1:
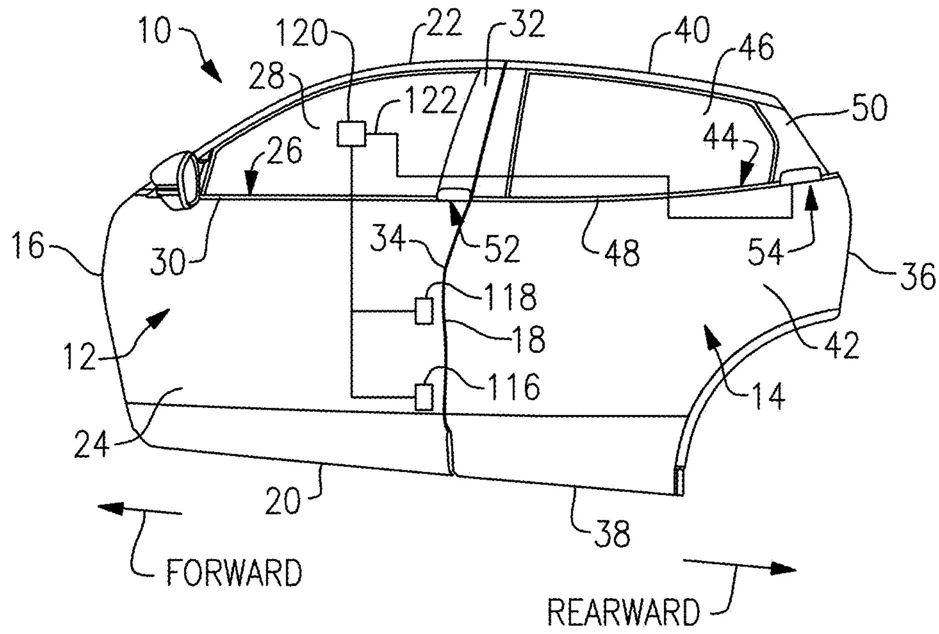
FIG. 1 is a side view of two doors of an example motor vehicle. In the example of FIG. 1, each of the doors includes a fixed door handle.
Figure 2:
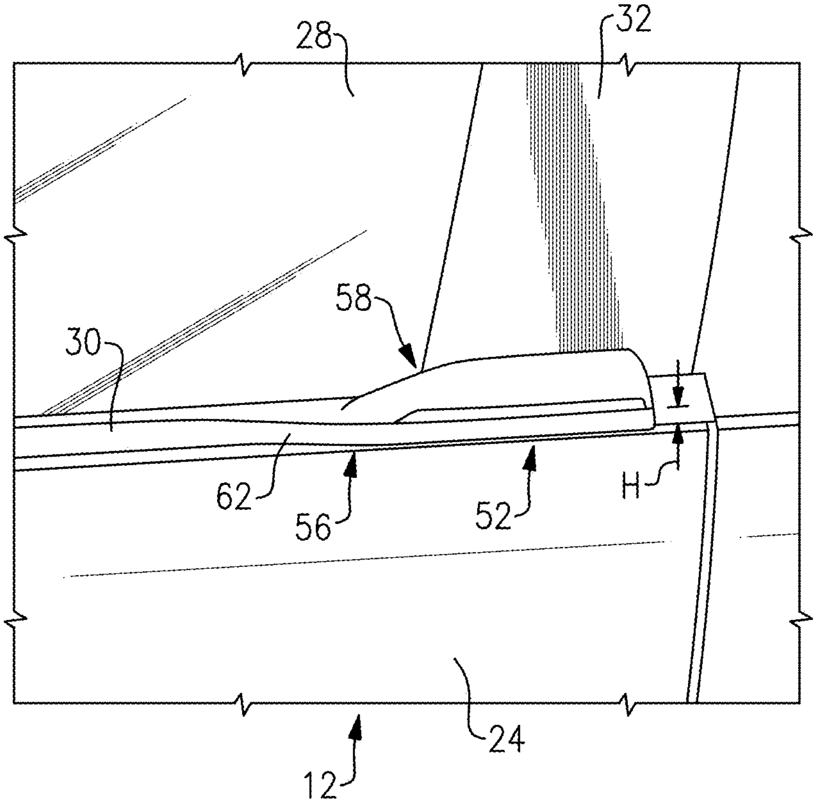
FIG. 2 is a close-up, side view of an example fixed door handle mounted relative to a first door of the motor vehicle.
Figure 3:
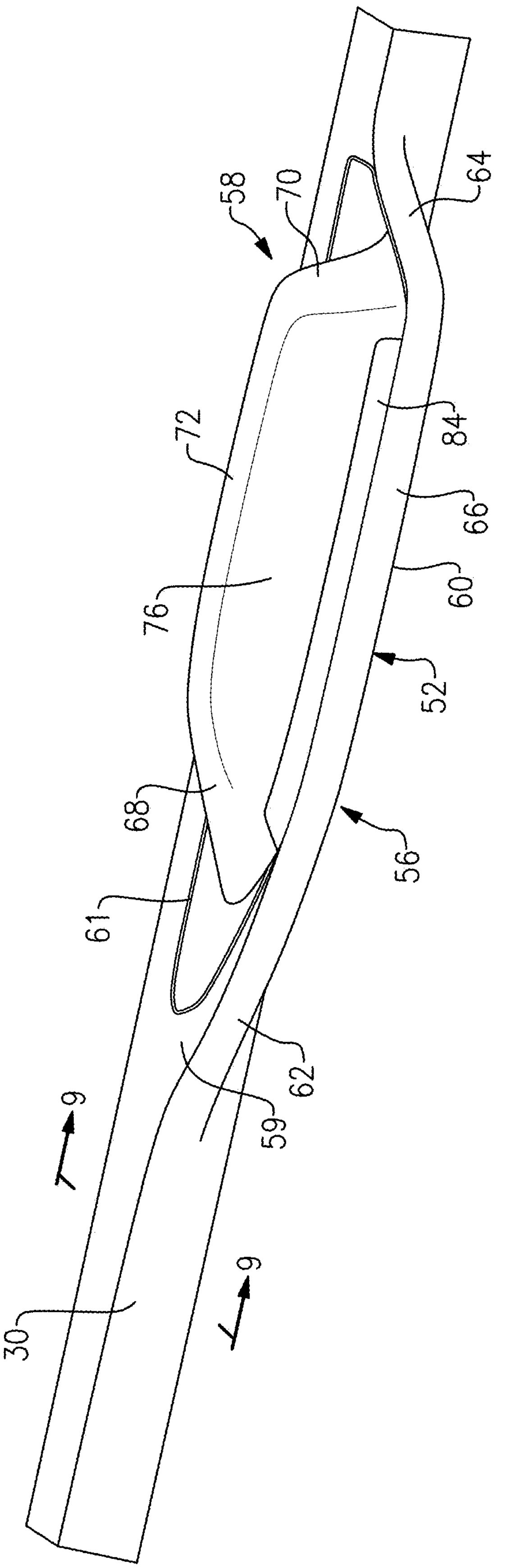
FIG. 3 is a rear perspective view of the fixed door handle and corresponding trim.

Referring to the drawings, FIG. 1 is a partial view of a first side, which in countries such as the United States is typically a driver side, of a motor vehicle 10 ("vehicle 10"). The vehicle 10 may be any type of vehicle, such as an SUV, sedan, van, or truck (including pickup trucks). Further, the vehicle 10 can be an electrified vehicle, such as a battery electric vehicle (BEV) or a hybrid electric vehicle (HEV), or another type of vehicle such as a vehicle powered only by an internal combustion engine.

The vehicle 10 includes a first door 12 and a second door 14 rearward of the first door 12. The "forward" and "rearward" directions are labeled in FIG. 1 for ease of reference. The first and second doors 12, 14 are mounted to a body of the vehicle 10 such that they are moveable to selectively open and close to uncover and cover respective door openings formed in the body of the vehicle 10. When closed, the first and second doors 12, 14, together with a window, are configured to completely enclose a respective door opening. When the first and second doors 12, 14 are open, users are able to enter and exit the vehicle 10 and/or insert items into, or retrieve items from, the vehicle 10. In this example, the first and second doors 12, 14 are connected to the body of the vehicle 10 by hinged connections permitting the first and second doors 12, 14 to pivot relative to the respective door opening. While FIG. 1 illustrates a first side of the vehicle 10 (e.g., the driver side), it should be understood that the vehicle 10 is substantially symmetrical about its centerline, and that the opposite side (e.g., the passenger side) of the vehicle 10 is arranged similarly, and in particular includes two door openings and two corresponding doors. Further, while in FIG. 1 there are two doors 12, 14, this disclosure extends to vehicles with other door arrangements, including one or more doors on each side of the vehicle.

The exterior of the first door 12 extends in the forward-and-rearward directions between a front edge 16 adjacent a vertical body-mounted pillar of the vehicle 10 and a rear edge 18 adjacent another vertical body-mounted pillar of the vehicle 10. The first door 12 extends vertically (i.e., up-and-down relative to FIG. 1) from a bottom edge 20 adjacent a ground surface to a top edge 22 adjacent a top of the vehicle 10. The first door 12 includes a main body panel 24 extending in the forward-and-rearward directions from the front edge 16 to the rear edge 18 and vertically from the bottom edge 20 to a vertical location 26 below a window opening 28 in the first door 12. At the vertical location 26, the first door 12 includes trim 30 covering a top edge of the main body panel 24 and extending in the forward-and-rearward direction along a bottom of a border of the window opening 28. The trim 30 is a belt molding in this example. The trim 30 includes an exterior surface, which may be called an "outer belt," and an inner surface, which may be called an "inner belt," configured to contact an interior of the main body panel 24 and/or the window 28. Adjacent the rear edge 18, the first door 12 also includes a panel, or applique 32, extending vertically from the trim 30 to the top edge 22 along a rear border of the window opening 28 and such that the applique 32 generally covers a portion of a vertical body-mounted pillar when the first door 12 is closed.

The exterior of the second door 14 is similarly-arranged. In particular, the second door 14 extends in the forward-and-rearward directions between a front edge 34 adjacent a vertical body-mounted pillar of the vehicle 10 and a rear edge 36 adjacent another vertical body-mounted pillar of the vehicle 10. The second door 14 extends vertically from a bottom edge 38 adjacent a ground surface to a top edge 40 adjacent a top of the vehicle 10. The second door 14 includes a main body panel 42 extending in the forward-and-rearward directions from the front edge 34 to the rear edge 36 and vertically from the bottom edge 38 to a vertical location 44 below a window opening 46 in the second door 14. At the vertical location 44, the first door 12 includes trim 48 covering a top edge of the main body panel 42 and extending in the forward-and-rearward directions along a bottom of a border of the window opening 46. The trim 48 is a belt molding configured substantially similar to the trim 30. Adjacent the rear edge 36, the second door 14 includes an applique 50, extending vertically from the trim 48 to the top edge 46 along a rear border of the window opening 46 and such that the applique 50 generally covers a portion of the vertical body-mounted pillar when the second door 14 is closed.

In this disclosure, both the first door 12 and the second door 14 are free of hingeable or pivotable exterior door handles, such as traditional door handles which are configured to hinge or pivot relative to a remainder of the door. In particular, the exteriors of the first door 12 and the second door 14 are free of handles having components hingeable or pivotable independent of the respective first or second door 12, 14 and/or handles having components hingeable or pivotable relative to the remainder of the handle to open a respective door 12, 14. In this disclosure, the first door 12 and the second door 14 include switch assemblies including electronic switches, such as push-buttons, that exhibit some level of movement. These relatively small movements, however, are not considered hingeable or pivotable movements in this disclosure. Despite the presence of such switch assemblies, the door handles of the present disclosure are still considered fixed door handles.

In the example of FIG. 1, the first door 12 includes a fixed door handle 52, which does not hinge or pivot relative to the first door 12, nor does it include components that are hingeable or pivotable relative to the remainder of the fixed door handle 52. Rather, the fixed door handle 52 is rigidly mounted to the first door 12 and does not include moveable components. Additional detail of the fixed door handle 52 will be discussed below. Further, in the example of FIG. 1, the second door 14 includes a fixed door handle 54. The fixed door handles 52, 54 are configured substantially similar to one another. Below, the fixed door handle 52 will be described in detail, and it should be understood that the fixed door handle 54 includes substantially the same structures and is configured to operate in substantially the same manner as the fixed door handle 52.

With reference to FIGS. 2-5, the fixed door handle 52 projects laterally outward from the first door 12, and specifically projects laterally outward from the trim 30. In this example, the fixed door handle 52 includes two sections, namely a base section 56 and a top section 58.

The base section 56 includes a top 59 (FIG. 3), a bottom 60, a leading edge 62, a trailing edge 64, and a lateral edge 66. In this example, the base section 56 is integrally formed with the trim 30. Despite being integrally formed, for ease of reference, the base section 56 will be referred to relative to the remainder of the trim 30, which is the portion of the trim 30 that follows the upper edge of the body panel 24.

The leading edge 62 of the base section 56 projects laterally from the trim 30 at an incline toward the lateral edge 66, which is spaced-apart laterally from the trim 30. In particular, the leading edge 62 is tapered moving in the forward direction such that the leading edge 62 gradually blends into the remainder of the trim 30. The amount of incline of the leading edge 62 may vary along its length, but will remain non-perpendicular to the trim 30. Arranging the leading edge 62 at an incline enhances both the aerodynamic properties of the fixed door handle 52 and the aesthetics of the fixed door handle 52.

The leading edge 62 of the base section 56 provides the leading edge of the fixed door handle 52. There is no seam between the leading edge 62 and the trim 30. As such, water management and aerodynamics of the fixed door handle 52 are increased with respect to designs that include a seam adjacent a leading edge of the handle and the various structures of the door, such as the trim 30.

The bottom 60 of the base section 56 is either vertically aligned with or vertically above a bottom of the remainder of the trim 30. Further, the top 59 of the base section 56 is either vertically aligned with or vertically below a top of the remainder of the trim 30. In this way, the base section 56 exhibits a height H (FIG. 2) between the top 59 and bottom 60 such that the base section 56, and in turn the fixed door handle 52 overall, aesthetically blends into the trim 30 when the fixed door handle 52 is viewed from an exterior perspective.

The top 59 of the base section 56 includes a recess configured to receive the top section 58 of the fixed door handle 52. The top section 58 may be inserted from the top and partially into the recess such that the top section 58 fits relatively snug with respect to the base section 56. A relatively small seam 61 may exist in the top 59 at the interface of the base section 56 and the top section 58. A seal may be provided at the interface.

The top section 58 includes a leading edge 68, a trailing edge 70, a top 72, an inner surface 74 (FIG. 4) facing the remainder of the first door 12, and an outer surface 76 (FIG. 3) facing away from the first door 12. During assembly, the top section 58 may be inserted into a recess in the top 59 of the base section 56. By forming the top section 58 separately from the base section 56, the top section 58 can be customized relative to different vehicle models and/or trims, while maintaining a common trim 30 and base section 56 relative to those different vehicle models and/or trims. This disclosure extends to fixed door handles 52 with integrally formed top and base sections, however.

The leading edge 68 of the top section 58 projects upward relative to the top 59 and is inclined rearwardly at an acute angle relative to the vertical direction. The leading edge 68 is tapered moving in the forward direction. From a visual perspective, the leading edge 68 gradually blends into the top 59 of the base section 56 moving forward. The arrangement of the leading edge 68 enhances both the aerodynamic properties of the fixed door handle 52 and the aesthetics of the fixed door handle 52. The amount of incline of the leading edge 68 may vary along its length, but will remain at an acute angle to the vertical direction.

Figure 4:
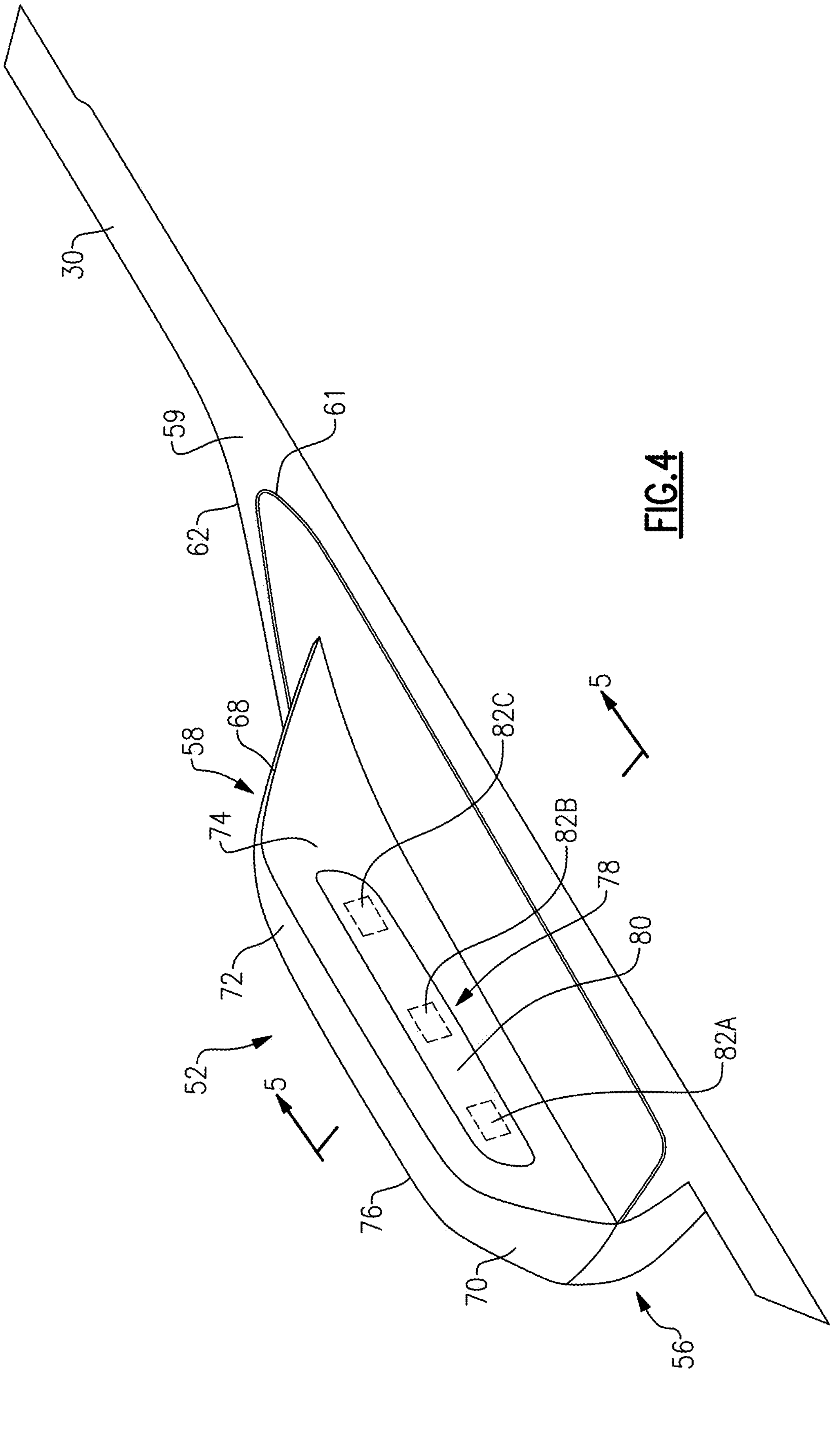
FIG. 4 is a rear perspective view of the fixed door handle and corresponding trim.

The inner surface 74 of the top section 58 includes a switch assembly 78 (FIG. 4). The switch assembly 78 is configured to generate an electric signal when pressed. A controller 120 (FIG. 1), which is discussed in more detail below, is configured to issue command(s) that unlock and/or present the first door 12 in response to the electric signal.

The switch assembly 78 includes a pad 80 configured to contact fingers of a user and a plurality of switches 82A-82C. In this example there are three switches 82A-82C, and the switches 82A-82C are each push-buttons. Each of the switches 82A-82C is capable of independently generating the electric signal discussed above. Providing more than one switch along the length of the pad 80 increases the reliability and ease of use of the switch assembly 78. That said, this disclosure extends to switch assemblies with one or more switch. This disclosure is not limited to any particular type of switch. Instead of push-buttons, for example, the switches 82A-82C could be capacitive touch sensors.

The outer surface 76 includes a light 84, in this example. The light 84 is not required in all examples. The light 84 may be a light bar and may provide a class A surface. The light 84 is operable in response to instructions from the controller 120, for example, to illuminate in a unique sequence. The sequence may be a custom sequence and may be set by a manufacturer or designated by a user.

The light 84 may include a film-based LED is capable of illuminating in a plurality of different colors, in a plurality of different sequences, and at variable intensities. The user can customize a "welcome" light, including selecting a custom color for the light 84 to illuminate and/or selecting a custom light sequence. For instance, the user could select an amber light color that gradually fades on as their "welcome" light. As another example, the user could select a green light color that flashes three times in succession and remains on following the third flash. As yet another example, the user could select a light pattern that involves illuminating multiple colors at once, such as half blue and half red. Other example light sequences and sequences come within this disclosure. The user selections may be made using a human-machine interface of the vehicle 10, such as the vehicle infotainment system, or via a software application of a mobile device of the user. Other example functions include commanding the light 84 to work in combination with other conspicuity lamps of the vehicle 10, including turn signals, brake lights, work lights, daytime running lamps, and 4-way flasher lights, as examples. For instance, when a user turns on a turn signal for a left-hand turn, the light 84 can flash simultaneously with the turn signals of the vehicle 10.

Figure 5:
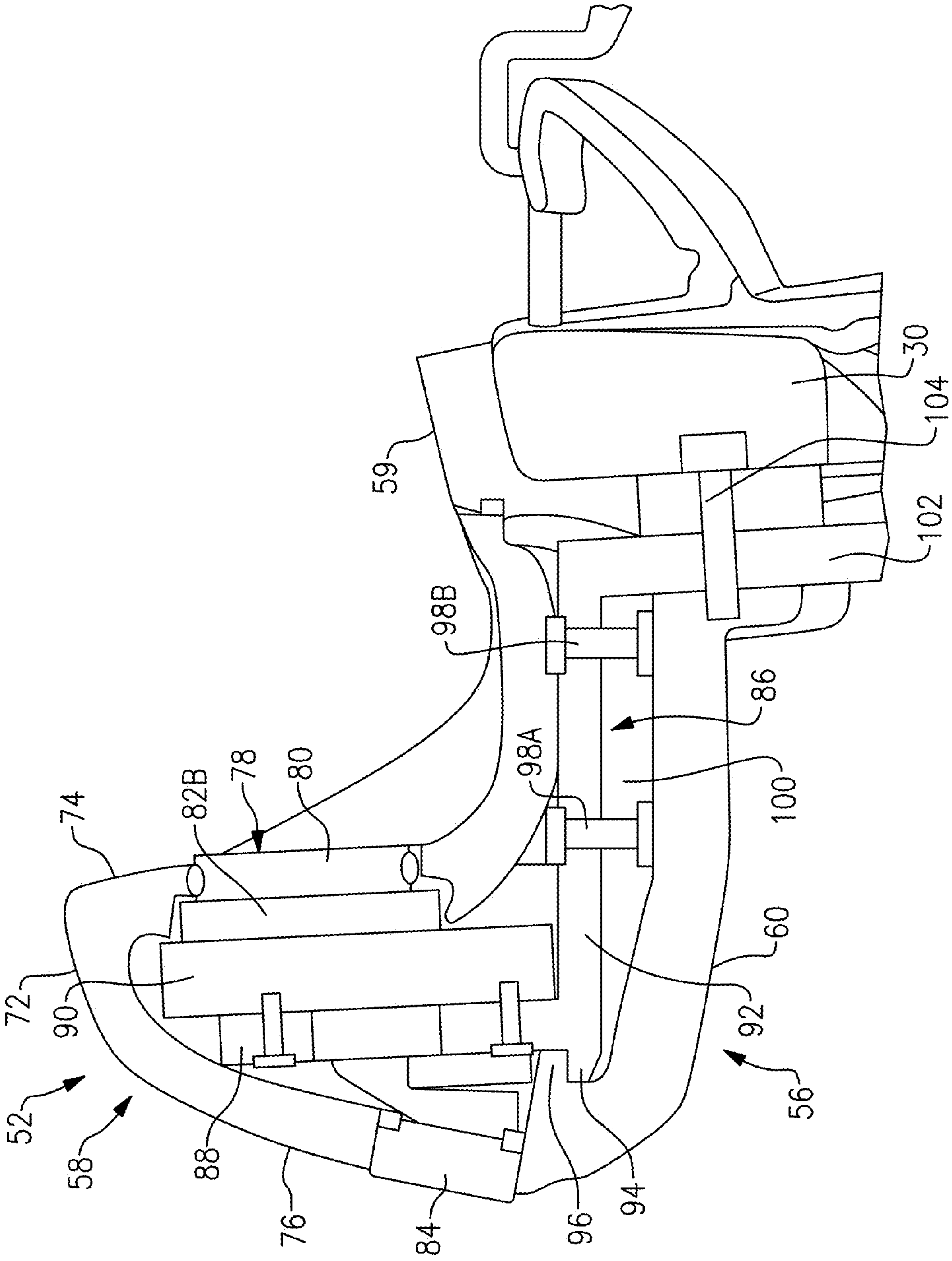
FIG. 5 is a cross-sectional view of the fixed door handle taken along line 5-5 from FIG. 4.

Various aspect of the fixed door handle 52 will now be described relative to FIG. 5, which is a cross-sectional view of the fixed door handle 52 taken along line 5-5 from FIG. 4. In general, as shown, the top section 58 includes a mount assembly 86 configured to facilitate mounting of the top section 58 relative to the base section 56 and the first door 12. In this example, the mount assembly 86 includes a metallic structure that extends within the top section 58 and downwardly, below the top section 58, to connect the top section 58 to the base section 56 and the first door 12.

Within the top section 58, the mount assembly 86 includes a first section 88 extending generally in a vertical direction. The first section 88 is connected, one an inner side, to a printed circuit board 90. The printed circuit board 90 is electrically connected to the switch assembly 78 and the light 84. The printed circuit board 90 may also by electrically connected to the controller 120.

A second section 92 of the mount assembly 86 projects in a horizontal direction from a bottom of the first section 88. The second section 92 is configured to interface with the base section 56 via tabs 94, 96. Specifically, the tab 94 of the second section 94 is vertically covered by the tab 96 of the base section 96. Further, the second section 92 interfaces with fasteners 98A, 98B, which may include nuts and bolts, to connect to a bottom cover 100 of the top section 58. In this example, the fasteners 98A, 98B include bolts and captured nuts. The cover 100 is configured to fit relative to the recess in the top 59 of the base section 56. The cover 100 may be an elastomer configured to account for tolerances in the fit between the base section 56 and the top section 58.

A third section 102 of the mount assembly 86 projects vertically downward from an opposite side of the second section 92 as the first section 88. Fasteners 104, which may include a nut and bolt, attaches the third section 102 to the base section 56. The fasteners 104, in this example, includes a nut captured by the trim 30. Fasteners other than nuts and bolts come within the scope of this disclosure.

Figure 6:
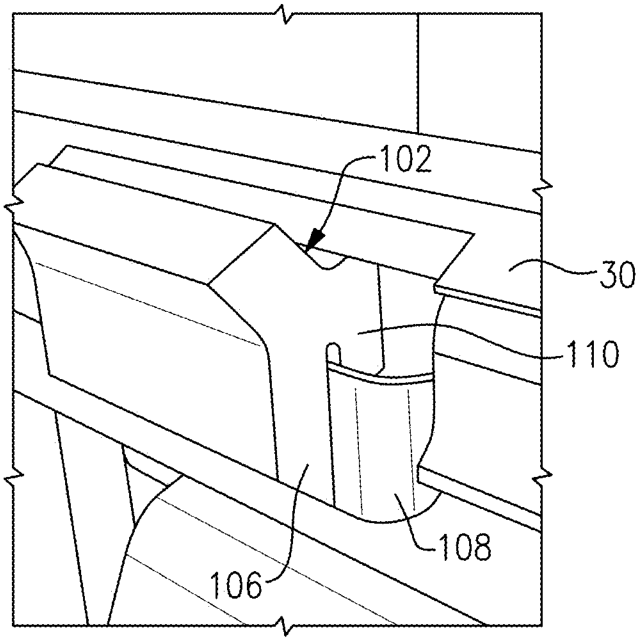
FIG. 6 illustrates some components of an example mount assembly for the fixed door handle.
Figure 7:
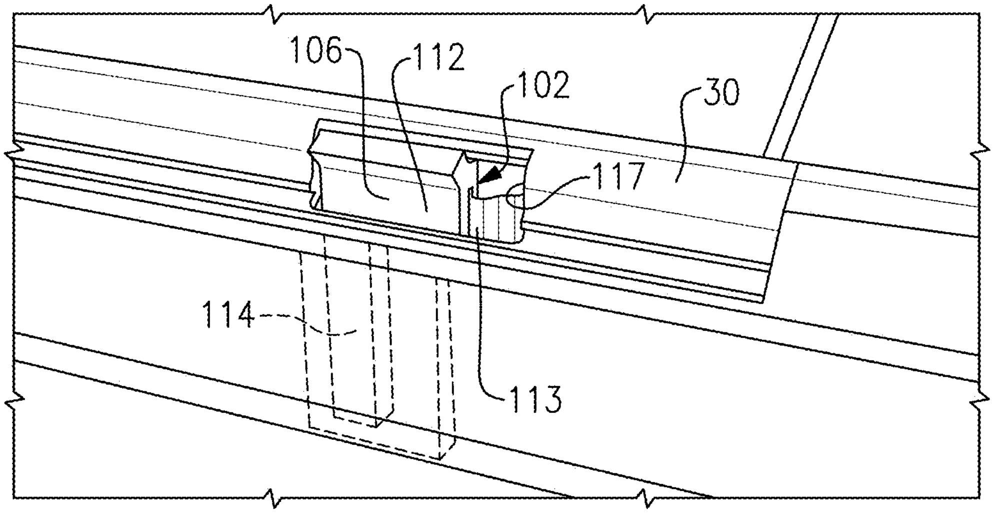
FIG. 7 illustrates some additional components of the example mount assembly.
Figure 8:
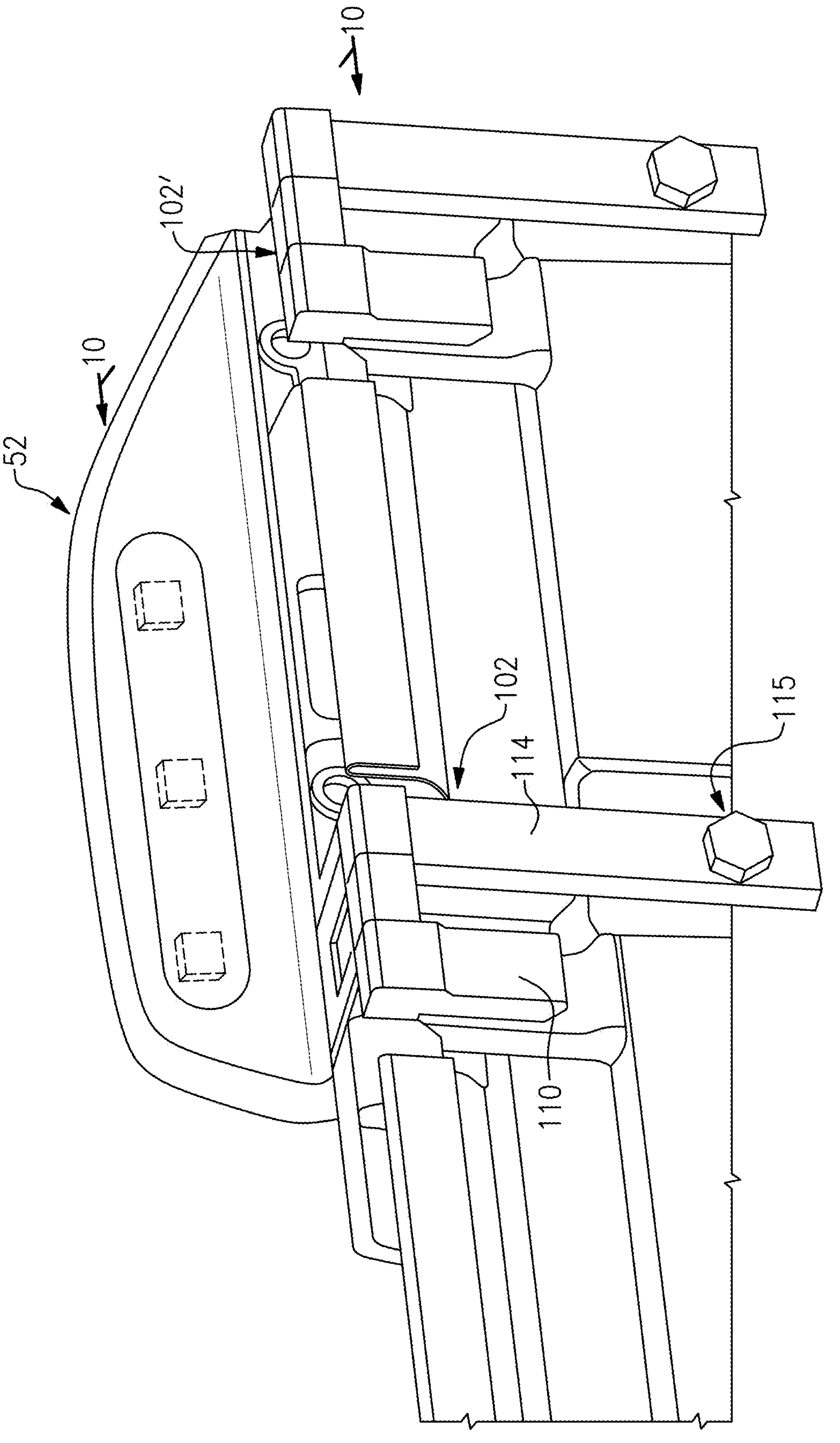
FIG. 8 illustrates an example mount assembly, viewed from an opposite side as in FIGS. 6 and 7.
Figure 9:
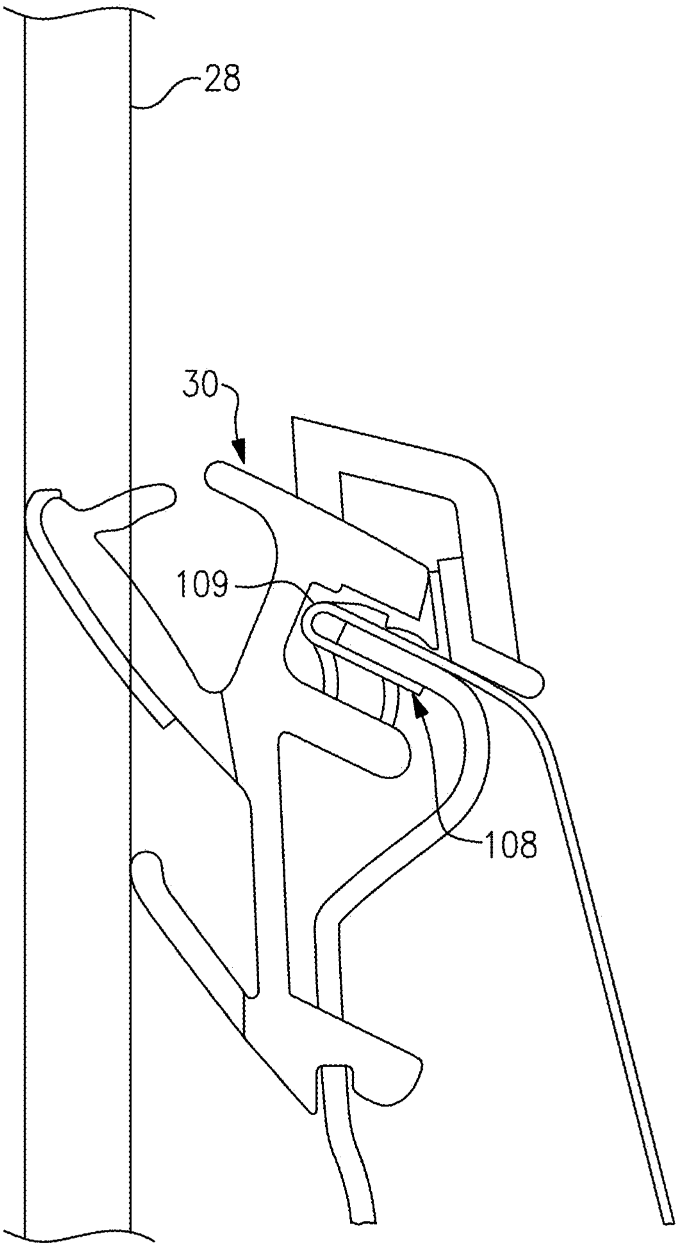
FIG. 9 is a cross-sectional view illustrating an example arrangement of a hem of an internal panel taken along line 9-9 from FIG. 3.
Figure 10:
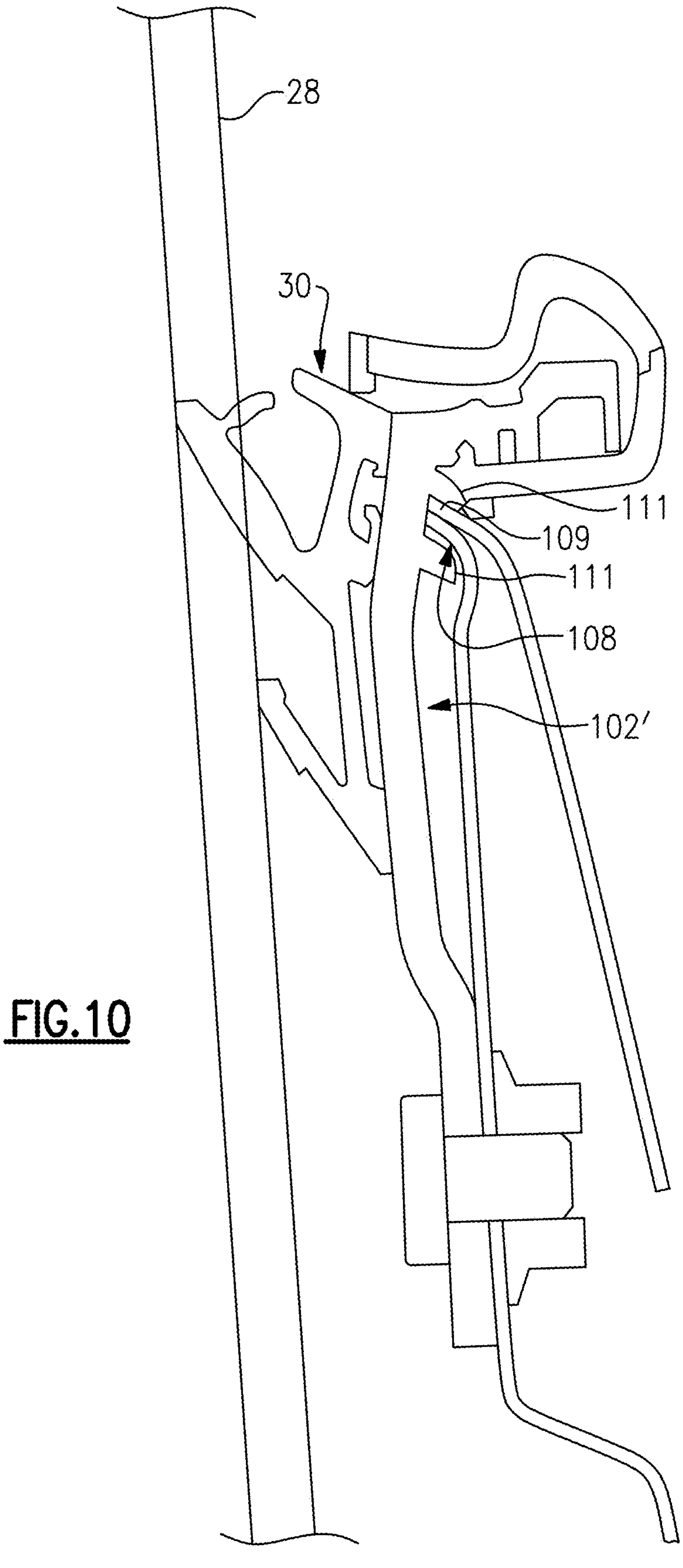
FIG. 10 is a cross-sectional view illustrating an example arrangement of a hem of an internal panel relative to a section of the mount assembly taken along line 10-10 from FIG. 8.

The third section 102 is configured to interface with a portion of an internal panel of the first door 12 adjacent a top edge, which may be referred to as a hem, of the internal panel. Example portions of the third section 102 are shown in FIGS. 6-7. In the example, the third section 102 includes at least one leg 106 projecting vertically downward of the trim 30 adjacent an internal panel 108 of the first door 12. The third section 102 also includes a hook 110 on an opposite side of the internal panel 108 as the leg 106. The hook 110 is not required in all examples, but may increase the ease of assembly when present. Fasteners such as nuts and bolts may be used to attach the third section 102, namely the leg and/or hook, to the internal panel 108. The third section 102 may include a plurality of legs 106 and/or hooks 110 along the length of the fixed door handle 52. For example, FIG. 8 illustrates an additional third section 102' adjacent the front of the fixed door handle 52. As perhaps best seen in FIGS. 7 and 8, the leg 106 may include two sections 112, 114 of different lengths, as shown in FIG. 7. In that example, fasteners 115 (FIG. 8) may interface with the section 114, which has a greater length than the section 112. Further, the hook 110 may only oppose the section 112. The internal panel 108, which may be a reinforcement, includes various notches and/or raised areas, such as raised area 113 (FIG. 7) sized and shaped to receive the various structures of the third section 102. The trim 30 may also include a cutout or notch, such as cutout 117 (FIG. 7), to receive the various structures of the third section 102 without interrupting a seal between the trim 30 and the first window 28. When the trim 30, such as a portion of the trim 30 that is configured to seal against the first window 28, includes a notch, the trim 30 may include a reinforcement structure adjacent such notches such as a metal seal carrier. The third section 102 may also include notches or tabs corresponding to the internal panel 108. For example, in FIG. 10, the third section 102' includes vertically spaced-apart tabs 111 receiving the top edge 109. Because of the various disclosed third sections 102, the top edge 109, or hem, of the internal panel 108 can be angled inwardly toward the first window 28, as shown in FIGS. 9 and 10, which permits the size, and in particular the height, of the trim 30 to be reduced relative to prior designs, which reduces the material required to form the trim 30 and provides a unique aesthetic appearance. In an example, the trim 30 exhibits a height 10 mm less than in previous designs.

An aspect of this disclosure relates to visually blending the fixed door handle 52 into the trim 30. In an example, the base section 56 exhibits a height H (FIG. 2) in a vertical direction which is substantially the same as or less than a corresponding height of the trim 30. Further, the leading edges 62, 68 of the base section 56 and top section 58, respectively, gradually taper moving in the forward direction so as to blend into adjacent surfaces and reduce the drag created by the fixed door handle 52. Additionally, while the top section 58 projects above the trim 30, a majority of the top section 58 is aligned, with respect to the forward and rearward directions, with the applique 32. Thus, the top section 58 visually blends into the applique 32 when the first door 12 is viewed from the side, especially when the fixed door handle 12 and applique 32 are the same color, such a black.

Additionally, the fixed door handle 52 is not bulky. The above-discussed features contribute to the fixed door handle 52 being perceived as being a part of the trim 30 and applique from various perspectives, despite the base section 56 projecting laterally outward from the remainder of the trim 30 and despite the top section 58 projecting above of the trim 30.

The first and second doors 12, 14 include a number of electromechanical components. FIG. 1 schematically illustrates some of those components relative to the first door 12. In this example, the first door 12 includes a door presenter assembly 116 configured to partially open the first door 12, a latch assembly 118 configured to selectively hold the first door 12 relative to the body of the vehicle 10 and to lock and unlock the first door 12, and a controller 120. The second door 14 includes a substantially similar arrangement components. The below discussion focuses on the first door 12, but it equally applies to the second door 14 and the other doors of the vehicle 10.

The controller 120 includes electronics, software, or both, to perform the necessary control functions for operating the vehicle 10 and executing various functions of the first door 12. In one non-limiting embodiment, the controller 120 is a combination vehicle system controller and powertrain control module (VSC/PCM). Although it is shown as a single hardware device, the controller 120 may include multiple controllers in the form of multiple hardware devices, or multiple software controllers within one or more hardware devices. Specifically, the controller 120 could be embodied as separate controllers, with one controller associated with each of the switch assembly 78, light 84, the door presenter assembly 116, and the latch assembly 118 instead of or in addition to the shared, centralized controller 120.

A controller area network (CAN) 122 allows the switch assembly 78, the door presenter assembly 116, and the latch assembly 118 to communicate with one another and, when present, to communicate with the controller 120. The CAN 122 may include a plurality of hard-wired connections between the switch assembly 78, the light 84, the door presenter assembly 116, the latch assembly 118, and the controller 120. The CAN 122 may connect the controller 120 to the printed circuit board 90, for example. When a central controller 120 is not present, the switch assembly 78, the light 84, the door presenter assembly 116, and the latch assembly 118 may be hard-wired to one another directly. Various connections of the CAN 122 are represented using lines in FIG. 1.

In response to the switch assembly 78 being activated, or pressed, the latch assembly 118 is configured to unlock the first door 12 if the first door 12 is not already unlocked, and the door presenter assembly 116 is configured to present the first door 12. Presenting the first door 12 refers to the door presenter assembly 116 moving the first door 12 to a partially open position. The partially open position is a position of the first door 12 between a fully closed position and a fully open position. In one example, the door presenter assembly 116 is configured to move, and in particular rotate, the first door 12 to a position in which the rear edge 18 of the first door 12 has traveled a distance of about 40 mm relative to the fully closed position. In this regard, the door presenter assembly 116 may include, in one example, a linearly moveable arm capable of projecting relative to the first door 12 by a distance of about 40 mm, and which is configured to selectively engage a body of the vehicle 10 to move the first door 12 to the partially open position. With the first door 12 partially open, a user can apply a force to the fixed door 12 to manually complete the process of opening the first door 12. During this process, the user is not required to take their hand off the fixed door handle 52 or to reposition their hand relative to the fixed door handle 52. Thus, the fixed door handle 52 conveniently permits the user to apply a force to the switch assembly 78 to unlock and/or present the first door 12 and permits the user to open the door manually by continuing to apply a force in that same location.

The door presenter assembly 116 is able to generate enough force to open the first door 12 even in cold weather conditions, such as when ice forms on the first door 12. While a door presenter assembly 116 is mentioned, this disclosure extends to doors without a door present assembly. In that case, in response to the switch assembly 78 being activated, the latch assembly 118 will unlock the first door 12 and a user can apply a force to the fixed door handle 52 to manually open the first door 12.

Before unlocking the first door 12, the vehicle 10 may perform one or more authorization steps before or after the switch assembly 78 is activated to confirm that the first door 12 should be unlocked. Example authorization steps include identifying whether a keyfob or mobile device of the user is within range of the vehicle 10. As another example authorization step, the user may input a predetermined alphanumeric code via a keypad on the exterior of the vehicle 10. After authorization and/or as the first door 12 unlocks, the light 84 may flash in sync with flashing of the headlamps and/or taillamps of the vehicle 10.

Directional terms such as "vertical," "upward," "downward," "forward," "rearward," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A door assembly for a motor vehicle, comprising:

a door mounted relative to an opening in a body of the motor vehicle such that the door is moveable between a fully closed position and a fully open position, wherein the door includes trim, wherein the trim is a belt molding; and a fixed door handle projecting outward from an exterior surface of the door, and wherein the fixed door handle includes a switch assembly configured to generate an electric signal when pressed, wherein the fixed door handle includes a base section and a top section, wherein the top section projects vertically above the trim, wherein the top section includes an inner surface facing the door and an outer surface facing away from the door, and wherein the switch assembly is arranged adjacent the inner surface of the top section such that the switch assembly faces the door.

2. The door assembly as recited in claim 1, wherein the switch assembly includes a pad and a plurality of switches configured to generate the electric signal.

3. The door assembly as recited in claim 1, wherein the door is free of pivotable exterior door handles.

4. The door assembly as recited in claim 1, further comprising a latch assembly configured to selectively lock and unlock the door, wherein the latch assembly is configured to unlock the door in response to the electric signal.

5. The door assembly as recited in claim 1, further comprising a door presenter assembly configured to move the door from the fully closed position to a partially open position in response to the electric signal.

6. The door assembly as recited in claim 1, wherein, in response to the signal from the switch assembly, the door is configured to both unlock and move to a partially open position.

7. A door assembly for a motor vehicle, comprising:

a door mounted relative to an opening in a body of the motor vehicle such that the door is moveable between a fully closed position and a fully open position, wherein the door includes trim; and a fixed door handle projecting outward from an exterior surface of the door, and wherein the fixed door handle includes a switch assembly configured to generate an electric signal when pressed, wherein the fixed door handle includes a base section and a top section, wherein the top section projects vertically above the trim, wherein the top section includes an inner surface facing the door and an outer surface facing away from the door, wherein the switch assembly is arranged adjacent the inner surface of the top section such that the switch assembly faces the door, and wherein the base section is integrally formed with the trim.

8. The door assembly as recited in claim 7, wherein:

the base section includes a top, bottom, leading edge, trailing edge, and lateral edge, the leading edge of the base section projects laterally outward from a remainder of the trim and is tapered moving in a forward direction, and the top of the base section includes a recess configured to receive the top section.

9. The door assembly as recited in claim 8, wherein:

the bottom of the base section is vertically aligned with or vertically above a bottom of the remainder of the trim, and the top of the base section is vertically aligned with or vertically below a top of the remainder of the trim.

10. The door assembly as recited in claim 8, wherein:

the top section includes a leading edge, a trailing edge, a top, an inner surface facing the door, and an outer surface facing away from the door.

11. The door assembly as recited in claim 10, wherein the leading edge of the top section is tapered in a forward direction.

12. The door assembly as recited in claim 10, wherein the outer surface of the top section includes a light.

13. The door assembly as recited in claim 12, wherein the light is configured to illuminate in a custom sequence selected by a user.

14. The door assembly as recited in claim 8, wherein the top section includes a mount assembly configured to interface with a panel of the door when the top section is received in the recess of the base section.

* * * * *